W. E. LOVER.
COMBINED LETTER SHEET, CHECK, ENVELOPE, AND CARBON COPY.
APPLICATION FILED JULY 8, 1918.

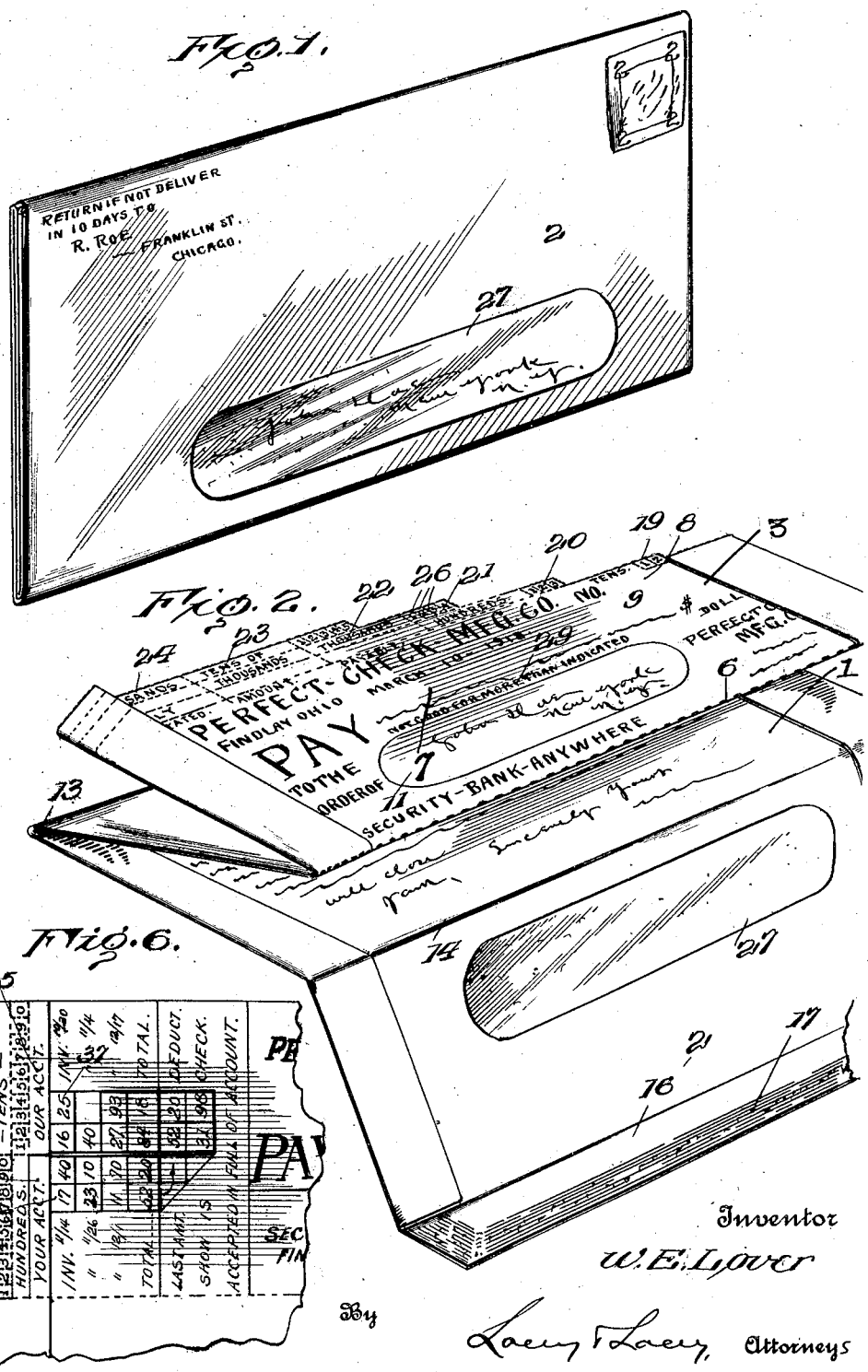

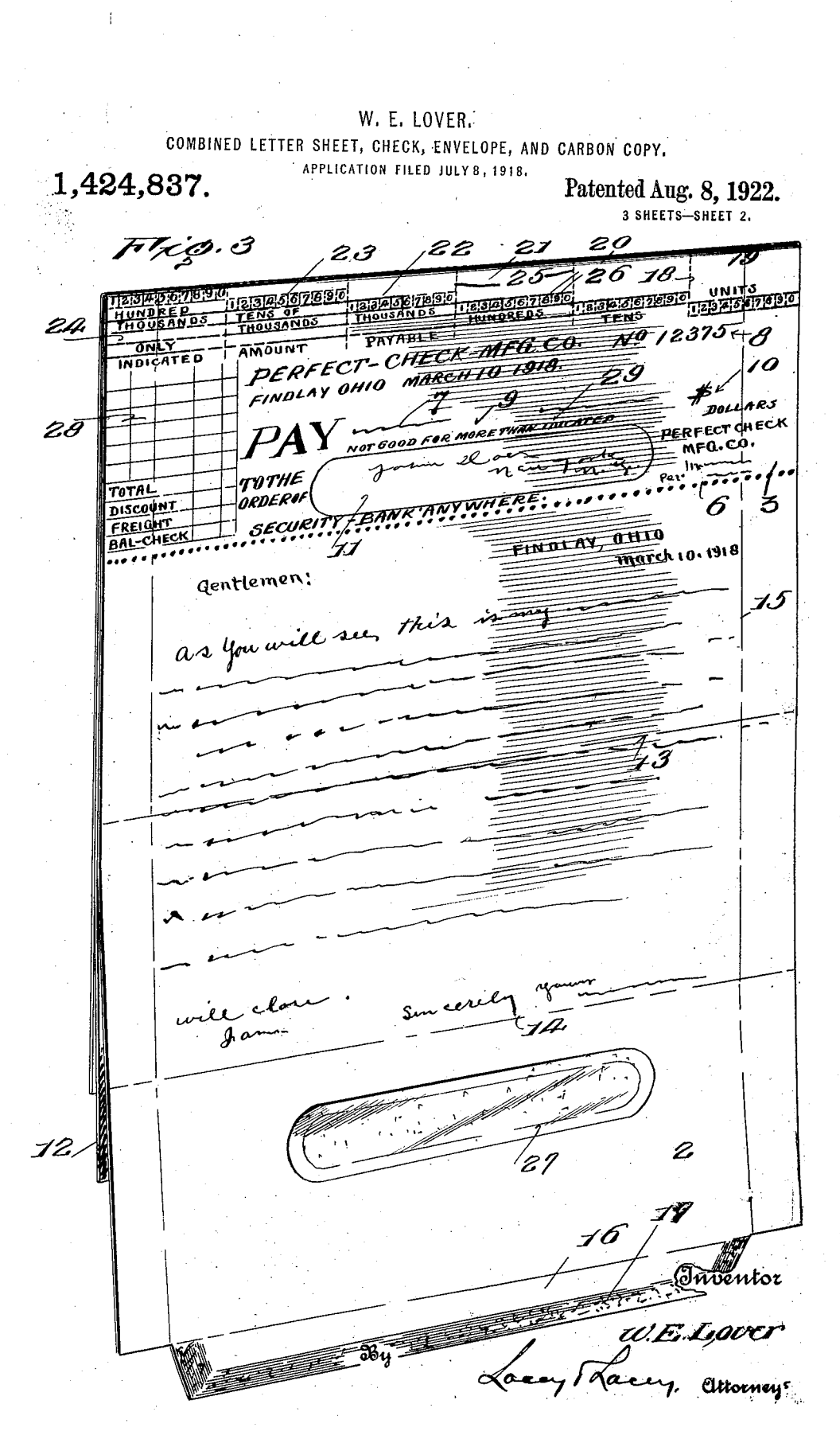

1,424,837.

Patented Aug. 8, 1922.

W. E. LOVER.
COMBINED LETTER SHEET, CHECK, ENVELOPE, AND CARBON COPY.
APPLICATION FILED JULY 8, 1918.
1,424,837.
Patented Aug. 8, 1922.
3 SHEETS—SHEET 3.
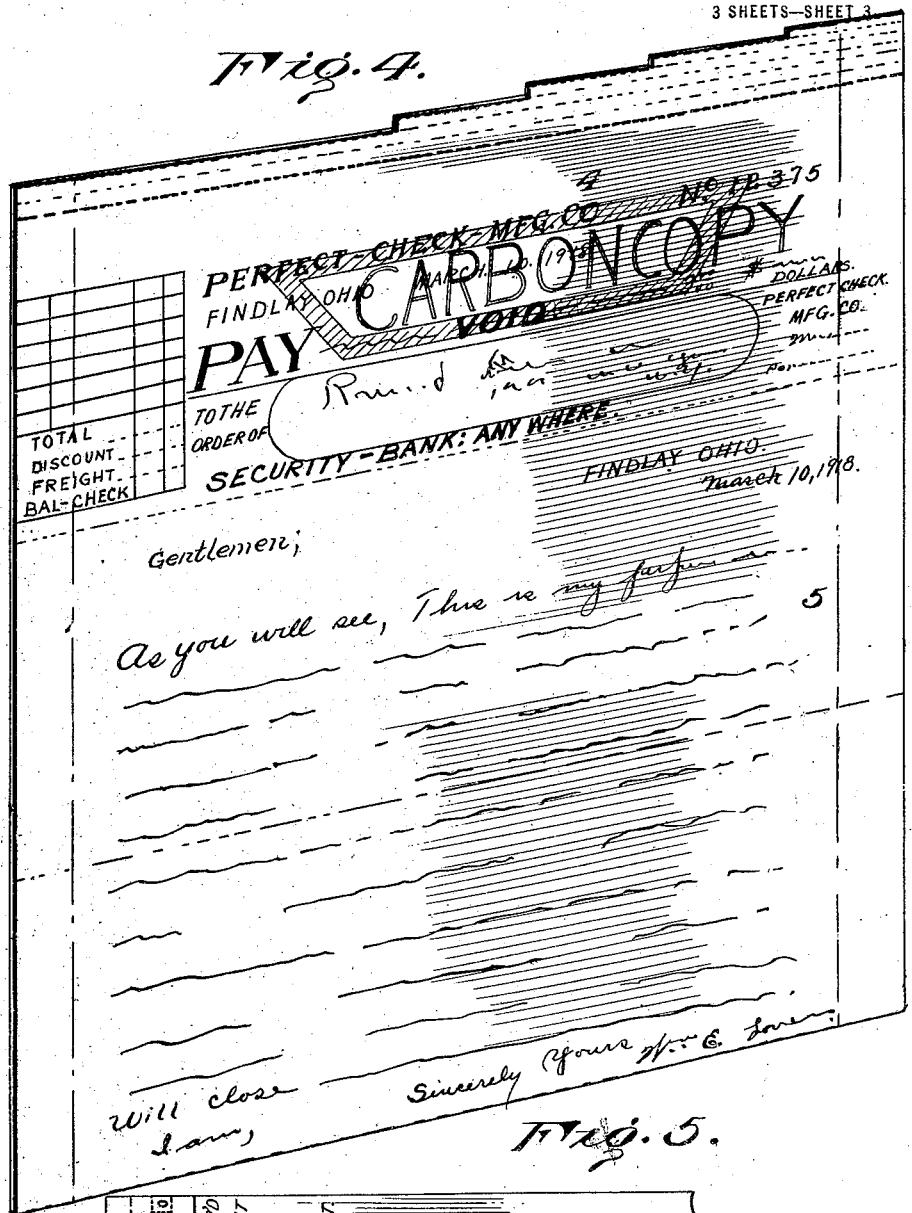
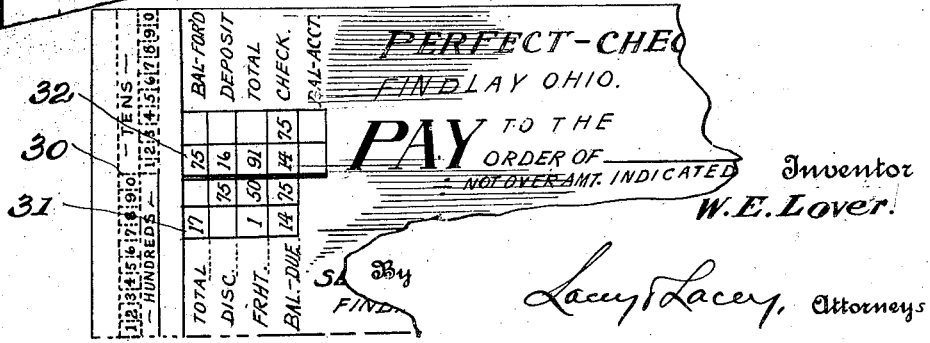
Inventor
W. E. Lover.
By Lacey & Lacey, Attorneys

UNITED STATES PATENT OFFICE.

WILLIAM E. LOVER, OF FINDLAY, OHIO.

COMBINED LETTER SHEET, CHECK, ENVELOPE, AND CARBON COPY.

1,424,837.  Specification of Letters Patent.  Patented Aug. 8, 1922.

Application filed July 8, 1918. Serial No. 243,825.

*To all whom it may concern:*

Be it known that I, WILLIAM E. LOVER, a citizen of the United States, residing at Findlay, in the county of Hancock and State of Ohio, have invented certain new and useful Improvements in Combined Letter Sheets, Checks, Envelopes, and Carbon Copies, of which the following is a specification.

This invention relates to combined letter sheets and envelopes and has as its object to provide in a single article, a letter sheet, a carbon copy or second sheet, a check, and an envelope.

It is one object of the present invention to provide an article of this class so constructed that in its use, a great amount of time will be saved in preparing the same for mailing, the construction being such that it is only necessary to once write the name and address of the addressee in order to accomplish the filling out of his name in the check, the heading of the letter, and the addressing of the envelope and making the carbon.

A further object of the invention is to provide in an article of this class, means whereby a carbon copy of the check may be obtained as well as a carbon copy of the letter which is to accompany the check so that by retaining this carbon copy the person giving the check and writing the letter will have at hand a complete record of the business transaction.

A further object of the invention is to so construct the check portion of the article that it will effectually protect the check to prevent raising thereof and so that when the check is returned from the bank it may be matched with the retained carbon in order, to ascertain whether or not any attempt was made to alter the amount of the check.

A further object of the invention is to provide in an article of this class, a construction in which the carbon copy will have its check portion integrally connected with the check portion of the letter sheet, which latter portion will be divided by lines of perforations arranged in connection with maximum amount indicating numerals so that in separating the letter sheet from the carbon copy, the letter sheet will be torn along the perforations to indicate the maximum amount for which the check is good, the torn-off marginal part of the check portion of the letter sheet remaining integrally connected with the carbon copy sheet so as to indicate the maximum amount of the check in addition to the carbon copy of the verbal and numeral amounts ordinarily stated.

A further object of the invention is to so connect the check portion with the letter sheet that the check may be filled in upon the typewriting machine at the time the letter is written.

In the accompanying drawings:

Figure 1 is a perspective view of the article embodying the present invention closed;

Figure 2 is a similar view illustrating the article partly folded prior to sealing;

Figure 3 is a perspective view of the article in condition upon removal from the typewriting machine and before folding;

Figure 4 is a perspective view of the carbon copy portion of the article detached from the original;

Figure 5 is a view of one end of an ordinary check illustrating a novel arrangement of data columns;

Figure 6 is a similar view illustrating another novel arrangement of data columns.

The article embodying the present invention includes, generally speaking, a letter sheet portion indicated by the numeral 1, an envelope portion indicated by the numeral 2, an original check portion indicated by the numeral 3, a carbon check portion indicated by the numeral 4, and a second sheet portion indicated by the numeral 5. The envelope portion 2 is integrally connected with the lower edge of the letter sheet portion 1 and the check portion 3 is integrally connected with the upper edge of the said letter sheet portion 1 being, however, readily separable therefrom through the provision of a line of perforations indicated by the numeral 6.

The check portion 3 bears the usual printing or any desired special arrangement of printed matter and this matter is substantially duplicated upon the face of the carbon copy check portion 4. For example, there is a space upon the check portion 3, indicated by the numeral 7, in which may be written the amount, a space 8 in which may be written or printed the number of the check, a space 9 in which is to be written in words the amount of the check, a space 10 in which the amount is to be written in figures, and a space 11 in which is to be written the name and address of the person in favor of whom the check is drawn and to whom the letter is addressed. As stated above the upper edge of the check portion 3 is integrally united with the upper edge of the carbon copy check portion 4 so that the original sheet of the article is connected as a whole with the upper edge of the carbon or second sheet as a whole. Therefore, a sheet of carbon paper, indicated by the numeral 12, may be interposed between the sheets before insertion of the article in the typewriting machine and, therefore, what is written upon the face of the original sheet comprising the letter portion 1 and check portion 3, will be duplicated upon the second sheet comprising the carbon copy check portion 4 and the second sheet portion 5. Thus in the use of the article the name and address of the person to whom the check is to be sent is written in the space 11 as shown in the drawings and then, beginning immediately below the line of perforations 6, there is written the salutation and the letter transmitting the check. As will be presently explained, the original sheet is designed to be folded along the line of perforations 6 and also along imaginary lines of fold indicated one by the numeral 13 and the other by the numeral 14, this latter line being the dividing line between the letter sheet portion 1 and envelope portion 2. Also the said original sheet is designed to be folded along imaginary lateral lines of fold 15 parallel to the lateral edges of the sheet as a whole and of any desired width. In order that the article may be sealed when folded, the envelope portion 2 is provided at its lower edge with an integral sealing flap 16 having a gummed area 17. The manner of folding and sealing the article will be presently fully explained.

In order that the check may be protected, means is provided which will now be described. The upper marginal area of the face of the check portion 3 is divided by a number of vertical lines 18, into a series of spaces of which there may be any desired number, these spaces being indicated in the drawings by the numerals 19, 20, 21, 22, 23 and 24. The spaces 19 to 24 inclusive are subdivided by vertical lines of perforations 25 and horizontal lines of perforations 26 so that each of the said spaces 19 to 24 inclusive will have ten sub-divisions in which, reading from left to right, there are printed numerals running consecutively from 1 to 9 and 0. Also the said spaces 19 to 24 inclusive are respectively designated by the words units, tens, hundreds, thousands, tens of thousands, hundreds of thousands. It will further be noted that the series of numerals in the units space 19 are located at the extreme bottom of the space and that the series of numerals in the succeeding spaces to the left are arranged in stepped order so that finally the series in the space 24 representing hundreds of thousands will be located at the extreme top of the said space. It will now be understood that after the check has been written as also the letter, the original sheet as a whole is to be separated from the second or carbon sheet by tearing along the lines of perforations 25 and 26 so that the highest numerals appearing in the spaces 19 to 24 inclusive will indicate a maximum amount above which the check is void. For example, if the check is drawn for five-thousand four-hundred and thirty-two dollars or any amount within one dollar or less, the original sheet will be torn along the line of perforations shown in the drawings leaving, attached to the upper edge of the carbon copy check portion 4, that portion of the margin of the check portion 3 embracing practically the entirety of the spaces 23 and 24, that portion of the space 22 embracing all numerals above 5, that portion of the space 21 embracing all numerals above 4, that portion of the space 20 embracing all numerals above 3, and that portion of the space 19 embracing all numerals above 2. After tearing off the marginal portion of the check 3 as above explained, the said check, the letter sheet portion 1, and the envelope portion 2, are folded in along the imaginary fold line 15; the check portion 3 is folded back along the line of perforations 6; the letter sheet portion 1 is folded along the imaginary fold line 13 until the line of perforations 6 registers with the imaginary fold line 14; the article is then folded along the said line 14 so that the transparent window of the envelope portion, which window is indicated by the numeral 27, overlies the space 11; and, finally, the closure flap 16 is folded down and secured by its adhesive area 17 to the rear side of the said letter sheet portion 1. The article is then in condition for the application of postage. Of course, the carbon copy of the letter and check will be retained for filing.

In order to preclude any possibility of the carbon copy of the check being cashed, it is preferable that either by tint printing or by water marking, the words "carbon copy, void" will appear across the face of the said carbon copy of the check.

Aside from the advantages possessed by the article in view of the ease and rapidity with which it may be prepared for mailing, the article possesses exceptional value as a check protecting medium inasmuch as the amount of the check appears in writing in the space 9, in numerals in the space 10, in the body of the letter stating the amount of the check, and in the upper marginal portion of the said check. Further if desired one end of the check may have its face ruled off as shown in the drawings at 28 so as to give data concerning the transaction, which data will include the amount of the check. It will be understood, of course, that while six spaces are provided ranging from units to hundreds of thousands in the upper marginal portion of the check, these limits may be varied by increasing or reducing the number of such spaces. It will also be understood that the check may bear upon its face as at 29 wording such as "not good for more than indicated," the words being either tint printed or water marked in the paper.

It will be understood from the foregoing description of the invention that the check protecting features thereof may be embodied in a single check independently of the letter sheet portions and carbon copy portions of the article. Also it will be understood that the equivalents of the series of spaces 19, 20, 21 etc. may be arranged at either end of the check form instead of at the upper margin thereof, or in fact may be arranged at any margin of the form or at any point upon the face of the form.

It will also be evident that the data columns 28 in the form shown in Fig. 3 of the drawings may be replaced by data columns such as shown in Figs. 5 and 6 of the drawings. In the form shown in Fig. 5 the bank account is kept upon the face of the check as well, if desired, as upon the ordinary stub which, however, is not shown in the drawings. For example, the check illustrated in this figure is provided at one end with spaces 30 of any desired number corresponding to the spaces 19, 20, 21 etc. heretofore described so that a maximum amount for which the check is good may be readily indicated by tearing off certain portions of these spaces. Also upon the face of this check there is a column 31 ruled off to receive written amounts and opposite the ruled lines dividing this column appear the words "Total," "Discount," "Freight" and "Balance Due." Another column 32 is provided beside the column 31, and opposite the ruled lines dividing this latter column appear the words "Balance forward," "Deposit," "Total," "Check" and "Balance of account," or equivalent words. Of course at the time the check is drawn the proper amounts are written in the several spaces or columns 31 and 32 and thus the recipient of the check will be apprised of the condition of the sender's account at the time the check was drawn and may feel reasonably sure that the check is good for the stated amount.

The check shown in Fig. 6 of the drawings, is provided with spaces 33 corresponding to the spaces 30 in the form of check shown in Fig. 5, and a portion of this check is ruled off to provide two main divisions 34 and 35 one of which is preferably headed "Your account" and the other is headed "Our account." This check form is intended to be used to show the relative balanced accounts of two debtors, and so the space 34 is rule off to provide a column 36, and the space 35 is ruled off to provide a column 37 in each of which columns may be written the amounts of various invoices rendered by one or the other of the debtors and the totals of the listed invoices of the respective parties. The column 37 is extended downwardly at its lower end to provide a space within which may be written the total amount of the invoices of one party which is to be deducted from the total amount of the invoices of the other party, and a space in which is to be written the amount of the check given, which amount will ordinarily be payment in full of account.

It will be understood, of course, that the modified forms illustrated in Figs. 5 and 6 may be embodied in the combined form first illustrated and described and also that both forms in the said Figs. 5 and 6 may be combined in a single form.

Having thus described the invention, what is claimed as new is:

1. In an article of the class described, an original sheet and a second sheet integrally connected along one edge to receive a manifolding sheet between them, the original sheet having upon its face a negotiable instrument form and the second sheet having upon its face a substantial duplicate of said form whereby a record of the instrument will be produced upon the duplicate form through the manifolding sheet, the united marginal portion of the negotiable instrument form of the first-mentioned sheet bearing series of numerals representing series of numerals arranged in decimal divisions, whereby when the original sheet is separated to leave connected therewith portions of the said margin bearing a selected arrangement of numerals a maximum amount will be left and the remainder of the said margin will remain integral with the said second sheet.

2. In an article of the class described, original and second sheets integrally connected along one edge, the original sheet embodying a negotiable instrument portion, a letter sheet portion, and an envelope portion, and the second sheet embodying a substantial duplicate of the negotiable instrument portion of the original sheet and a letter sheet portion to receive a copy of matter written upon the letter sheet portion of the original sheet.

3. In an article of the class described, original and second sheets integrally connected along one edge, the original sheet embodying a negotiable instrument portion, a letter sheet portion, and an envelope portion, and the second sheet embodying a substantial duplicate of the negotiable instrument portion of the original sheet and a letter sheet portion to receive a copy of matter written upon the letter sheet portion of the original sheet, the negotiable instrument portion of the original sheet adjacent its united margin being divided by intersecting weakened lines into a plurality of series of spaces bearing numerals arranged in series in decimal divisions.

4. In an article of the class described, original and second sheets integrally connected along one edge, the original sheet embodying a negotiable instrument portion, a letter sheet portion, and an envelope portion, and the second sheet embodying a substantial duplicate of the negotiable instrument portion of the original sheet and a letter sheet portion to receive a copy of matter written upon the letter sheet portion of the original sheet, the negotiable instrument portion of the original sheet adjacent its united margin being divided by intersecting weakened lines into a plurality of series of spaces bearing numerals arranged in series in decimal divisions, the negotiable instrument portion of the original sheet having a space divided off to receive a name and address, and the said envelope portion having a transparent area designed to overlie said space in the folded condition of the original sheet.

In testimony whereof I affix my signature.

WILLIAM E. LOVER. [L. S.]